United States Patent [19]

Akiyama et al.

[11] Patent Number: 4,649,174

[45] Date of Patent: Mar. 10, 1987

[54] COLORING COMPOSITION

[75] Inventors: Kazutoshi Akiyama, Matsubara; Takashi Ono, Takatsuki, both of Japan

[73] Assignee: Orient Chemical Industries, Ltd., Osaka, Japan

[21] Appl. No.: 670,870

[22] Filed: Nov. 13, 1984

[30] Foreign Application Priority Data

Nov. 22, 1983 [JP] Japan ................................ 58-220447

[51] Int. Cl.$^4$ .............................................. C08L 79/02
[52] U.S. Cl. ............................ 524/841; 260/DIG. 38; 524/846
[58] Field of Search ................. 106/20; 260/DIG. 38; 523/161, 160; 524/809, 811, 812, 816, 817, 832, 833, 841, 846

[56] References Cited

U.S. PATENT DOCUMENTS 3,846,141 11/1974 Ostergren et al. .................... 106/22

OTHER PUBLICATIONS

Chemical Abstract No. 92:165425e, Japan Kokai JP 54/148624[79/148624], Nov. 21, 1979.

Primary Examiner—Amelia B. Yarbrough
Attorney, Agent, or Firm—Birch, Stewart, Kolasch and Birch

[57] ABSTRACT

There is provided hereby a coloring composition having an excellent water resistance and solution stability, which comprises a reaction mixture of (a) a vinyl compound soluble in water or in a water soluble organic solvent, with (b) a compound which contains more than two groups having a active hydrogen, at least one group of which is an amino group or imino group, in the presence of a water soluble dye and optionally a solvent.

20 Claims, No Drawings

COLORING COMPOSITION

FIELD OF THE INVENTION

The present invention relates to a coloring composition suitable for a writing utensil, a print, a record, a stamp and a coloring of a paper.

BACKGROUND OF THE INVENTION

An aqueous ink contains various kinds of water soluble dyes. These aqueous inks have excellent solution stability, but have bad water resistance when used in a written trace or in a printed image. Especially, it is more difficult to provide the excellent water resistance to the aqueous ink right after writing down.

Various improvements have been proposed to overcome the above undesirable water resistance, for example, Japanese Pat. Publn. (unexamined) Nos. 31526/1976, 115306/1978, 116762/1981, 131678/1981, 10658/1982, 30772/1982, 102972/1982, 198768/1982, 202359/1982 and 1764/1983 and Japanese Pat. Publn. (examined) No. 6581/1965. Among them, the use of a direct ink was proposed, but this ink does not have sufficient water resistance and does not have good solubility at a low pH solution. A solution of a high pH hydrolyzes an acetate fiber used in a storage material of a felt tip pen container to lower physical properties of the ink or dye. Also the dye does not have a good color tone other than a black one. However the black dye may increase the viscosity or gelation of the ink.

An ink containing a water insoluble dye dissolved in an organic solvent provides sufficient water resistance. It, however, spreads easily and also has an irritating smell because of using an organic solvent.

Also, an emulsion or dispersion ink using the water insoluble dye or a water insoluble pigment was proposed. It, however, has an insufficient stability with time and may have a plugging of a capillary passageway of the storage material.

There exists an ink by which a written trace is made water insoluble with time because of a reaction of the written trace with light or oxygen in the air. It, however, takes a long time to appear the water resistance, and this ink has a possibility to change a color.

Furthermore, it was also proposed that an ink was prepared by adding an additive (including a polymer) increasing the water resistance to the water soluble dye. This ink is not expected to have the excellent resistance right after writing down. The ink is not stable to a pH change so that it has to be kept in a small range of pH. The additive ink having higher water resistant has a bad storage stability.

SUMMARY OF THE INVENTION

The present invention provides a coloring composition comprising a reaction mixture of
 (a) a vinyl compound soluble in water or in a water soluble organic solvent, with
 (b) a compound which contains more than two groups having an active hydrogen, at least one group of which is an amino group or imino group,
in the presence of a water soluble dye and optionally a solvent.

DETAILED DESCRIPTION OF THE INVENTION

The coloring composition of the present invention provides an excellent property in the water resistance and the stability with time. It is believed that a reaction among the water soluble dye, the vinyl compound and the active hydrogen containing compound, or a polymerization reaction of the vinyl compound (a part of the vinyl compound indicates an exothermic reaction) contributes to an increase of the stability and an affinity with a paper.

Examples of the water soluble dye are a direct dye, an acid dye, a basic dye, a metallized complex dye and the like.

The composition of the present invention may contain the water soluble dye in the amount of from 30 to 50 percent by weight. Amounts less than 30 percent by weight are undesirable because of insufficient coloring value of the obtained composition. Amounts greater than 50 percent by weight make the reaction ununiform so as not to proceed the reaction under control.

Examples of the vinyl compound soluble in water or in an water soluble organic solvent are acrylic acid, 2-hydroxyethyl acrylate, acrylamide, 2-acrylamide-2-methylpropanesulfonic acid, methacrylic acid, 2-hydroxyethyl methacrylate, diethylaminoethyl methacrylate, 2-methoxypolyethylene glycol methacrylate, allylsulfonic acid, styrenesulfonic acid, N-vinylpyrrole, N-vinylpyrrolidone, N-vinylsuccinimide, 5-vinylpyrazoline, N-vinylethyleneurea, N-vinyloxazolidone, 2-vinylthiazole, 2-vinylpyridine, 4-vinylpyridine, 1-methyl-2-vinylpiperidine, 4-vinylpiperidine, N-vinylpiperidone, 2-vinylpyrazine, N-vinylcaprolactam and a mixture thereof. Preferred examples are 2-hydroxyethyl acrylate, 2-hydroxyethyl methacrylate, 2-methoxypolyethylene glycol methacrylate, N-vinylpyrrole, N-vinylpyrrolidone, N-vinylsuccinimide, N-vinylethyleneurea, N-vinyloxazolidone, 1-methyl-2-vinylpiperidine, N-vinylpiperidone and N-vinylcaprolactam.

Preferably, the amount of the vinyl compound is from 10 to 40 percent by weight in the reaction composition. Amounts less than 10 percent by weight are undesirable because of insufficient water resistance in a written trace. Amounts greater than 40 percent by weight are undesirable, because large amounts of the water soluble organic solvent are required for making an ink solution.

The active hydrogen containing compound according to the present invention has more than 2 groups (or 2 atoms) which contain active hydrogen respectively, at least one group of which is an amino group or imino group. Examples of these compounds are m-aminophenol, p-aminophenol, 2-aminophenol-4-sulfonamide, m-phenylenediamine, p-phenylenediamine, 2-chloro-m-phenylenediamine, 2,5-dichloro-m-phenylenediamine, tolylene-2,4-diamine, m-xylylenediamine, m-phenylenediamine-4-sulfonic acid, o-tolidine, 2-phenyl-4,5,-dihydroxymethylimidazol, 5,5-dimethylhydantoine, melamine, melamine resin, guanidine, diphenylguanidine, benzoguanamine, urea, thiourea and a mixture thereof. Preferred examples are m-aminophenol, m-phenylenediamine, p-phenylenediamine, 2-chloro-m-phenylenediamine, m-phenylenediamine-4-sulfonic acid, 5,5-dimethylhydantoine, diphenylguanidine, benzoguanamine, urea and thiourea. Also the active hydrogen containing compound may contain a back-bone of the water soluble dye mentioned above in a molecule. The active hydrogen containing compound is preferably contained in the amount of 2 to 10 percent by weight in the reaction composition. Amounts less than 2 percent by weight are undesirable because of insufficient solution stability and water resistance of the obtained composition. Amounts greater than 10 percent by weight are undesirable because the obtained product has poor quality.

A molar ratio of the vinyl compound to the active hydrogen containing compound is 100:5 to 30.

In the present invention, the reaction of the vinyl compound with the active hydrogen containing compound can be conducted without a solvent or in the presence of a solvent. The solvent can dissolve all reactants such as the dye, the vinyl compound and the active hydrogen containing compound. Especially, preferred solvents are those that the reaction mixture can be dissolved to a low viscosity. Examples of the solvent are lower molecule alcohols having 1 to 6 carbon atoms; glycols such as ethylene glycol, diethylene glycol and the like; triethyleneglycols; glycol ethers such as ethylene glycol monoethyl ether, ethylene glycol mono-n-butyl ether, diethylene glycol monomethyl ether and the like; glycol monoacetate; glycerol; glycolic acids; ethylene carbonate; butyrolactone; 2-pyrrolidone; N-methylpyrrolidone; dimethyl formamide; tetrahydrofuran; dioxane; dimethylsulfoxide; and a mixture thereof. The amount of these organic solvent is generally less than 40 percent by weight in the reaction composition.

According to the invention, the reaction of the vinyl compound with the active hydrogen containing compound may be conducted under the presence of a catalyst. Preferred examples of the catalyst are an acid catalyst such as hydrogen chloride, sulfuric acid, phosphoric acid, benzenesulfonic acid, p-toluenesulfonic acid, a free acid of the above vinyl compound, an acid salt of the active hydrogen containing compound, a free acid of the dye and a coloring acid; an azo-initiator such as 2,2-azobisisobutyronitrile, a peroxide-catalyst such as benzoyl peroxide, butyl peroxide and the like. Preferred catalyst is the acid catalyst. The content of the catalyst is less than 5 percent by weight in the reaction mixture.

The above reaction is conducted at a temperature of 10° to 160° C., preferably 60° to 110° C. for 0.5 to 10 hours.

The composition obtained from the above reaction, i.e. the reaction production of the above water-soluble dye, the vinyl compound with the active hydrogen containing compound is optionally dissolved in water and/or a water soluble organic solvent to obtain the coloring composition. The concentration of the composition is from 15 to 25 percent by weight in terms of amount of the dye.

In case that the obtained coloring composition indicates acidic, the pH can be adjusted with ammonia, sodium hydroxide, potassium hydroxide, lithium hydroxide, or an alkanolamine.

The coloring composition of the present invention has excellent stability with time and within the extended pH range. The extension of ph range is 2 to 3 in pH in comparison with a conventional one using the same dye. A dye which could be used only in a strong acid range or a strong basic range in a conventional type composition is made usable in a neutral range.

A process for preparing an ink composition from the obtained coloring composition can comprise mixing distilled water with 15 to 60 parts of the coloring agent and 15 to 30 parts of the water soluble organic solvent to obtain 100 parts of a mixture, optionally followed by filtrating. The resultant mixture, i.e. the ink composition can be formulated with another conventional additive such as a surfactant, an anti-corrosive agent and a mildewcide.

The ink composition prevents effectively corrosion and a plugging of a capillary passageway and has an excellent water-resistance of a written trace or a printed image.

The present invention is illustrated by the following examples, which, however, are not construed as limiting the present invention. In the examples, all parts and percentages are by weight unless otherwise specified.

EXAMPLE 1

A coloring composition was prepared from the following formulation:

| Ingredients | Parts by weight |
| --- | --- |
| Free acid type C.I. Acid Red 87 | 100 |
| 4-vinylpyridine | 68 |
| Thiourea | 8 |
| N—methylpyrrolidone | 50 |

The above ingredients were charged in a four-necked 500 ml flask equipped with a stirrer, a thermometer and a condenser and mixed for 1 to 2 hours at room temperature. The mixture was heated gradually and then it was held at 90° to 100° C. for one hour. The mixture was, furthermore, held at 60° C. for 2 hours.

To the resultant reaction product was added warm water of 200 parts and then the pH was adjusted to 8 to 9 with sodium hydroxide, followed by filtrating. To the reaction product was added water to obtain the coloring composition containing 20 percent by weight of C.I. Acid Red 87.

EXAMPLE 2

A coloring composition was prepared from the following formulation:

| Ingredients | Parts by weight |
| --- | --- |
| C.I. Acid Yellow 11 | 100 |
| N—vinylmonoethyleneurea | 73 |
| m-phenylenediamine | 10 |
| Ethylene glycol | 50 |

The above ingredients were charged in the reaction vessel used in Example 1 and mixed for one hour at room temperature. After hydrochloric acid of 10 parts was added into the resultant mixture, it was mixed for one hour and then heated as described in Example 1.

To the resultant reaction product was added warm water and then the pH was adjusted to 8 to 9 with lithium hydroxide to obtain a coloring composition containing 15 percent by weight of the dye.

EXAMPLE 3

A coloring composition was prepared from the following formulation:

| Ingredients | Parts by weight |
| --- | --- |
| C.I. Acid Black 2 | 100 |
| 2-hydroxyethyl methacrylate | 85 |
| Benzoguanamine | 10 |
| 2-pyrrolidone | 50 |

The above ingredients were charged in the reaction vessel used in Example 1 and mixed for one hour at room temperature. After azobisisobutyronitrile of 3 parts was added to the mixture, the reaction was conducted at a temperature of 90° to 100° C. for 5 hours.

To the resultant reaction product was added warm water and then the pH was adjusted to 9 to 10 with sodium hydroxyde to obtain a coloring composition containing 25 percent by weight of the dye.

EXAMPLE 4

A coloring composition was prepared from the following formulation:

| Ingredients | Parts by weight |
| --- | --- |
| Free acid type C.I. Direct Black 154 | 100 |
| N—vinylpyrrolidone | 72 |
| p-aminophenol | 10 |
| diethylene glycol | 60 |

The above ingredients were reacted and treated generally as described in Example 1 and then the pH was adjusted to 10 to 10.5 with sodium hydroxide to obtain a coloring composition containing 15 percent by weight of the dye.

EXAMPLE 5

A coloring composition was prepared from the following formulation:

| Ingredients | Parts by weight |
| --- | --- |
| Color acid type C.I. Acid Black 52 | 100 |
| 4-vinylpyridine | 34 |
| Acrylamide | 23 |
| Guanidine hydrochloride | 10 |
| N—methylpyrrolidone | 50 |

The above ingredients were reacted and treated generally as described in Example 1 and then the pH was adjusted to 7 to 8 with sodium hydroxide to obtain a coloring composition containing 20 percent by weight of the dye.

EXAMPLE 6

A coloring composition was prepared from the following formulation:

| Ingredients | Parts by weight |
| --- | --- |
| C.I. Basic Violet 3 | 100 |
| 2-hydroxyethyl acrylate | 75 |
| Melamine | 10 |
| Methylene glycol | 50 |

The above ingredients were reacted and treated generally as described in Example 1 and then the pH was adjusted to 3 to 4 with ammonia to obtain a coloring composition containing 20 percent by weight of the dye.

EXAMPLE 7

A coloring composition was prepared from the following formulation:

| Ingredients | Parts by weight |
| --- | --- |
| Free acid type C.I. Direct Blue 86 | 100 |
| 4-vinylpyridine | 68 |
| 2-aminophenol-4-sulfonamide | 15 |
| N—methylpyrrolidone | 50 |
| p-toluensulfonic acid | 2 |

The above ingredients were reacted and treated generally as described in Example 2 and then the pH was adjusted to 9 to 10 with sodium hydroxide to obtain a coloring composition containing 20 percent by weight of the dye.

EXAMPLE 8

A coloring composition was prepared from the following formulation:

| Ingredients | Parts by weight |
| --- | --- |
| C.I. Acid Blue 90 | 100 |
| 2-hydroxyethyl methacrylate | 37 |
| N—vinylpyrrolidone | 36 |
| Tolylene-2,4-diamine | 10 |
| Ethylene glycol | 70 |
| Sulfuric acid | 1 |

The above ingredients were reacted and treated generally as described in Example 2 and then the pH was adjusted to 6 to 7 with sodium hydroxide to obtain a coloring composition containing 20 percent by weight of the dye.

EXAMPLE 9

A coloring composition was prepared from the following formulation:

| Ingredients | Parts by weight |
| --- | --- |
| C.I. Acid Blue 25 | 100 |
| Styrenesulfonic acid | 46 |
| o-tolidine | 5 |
| Diethylene glycol | 60 |
| Azobisisobutyronitrile | 2 |

The above ingredients were reacted and treated generally as described in Example 3 and then the pH was adjusted to 8 to 9 with sodium hydroxide to obtain a coloring composition containing 15 percent by weight of the dye.

EXAMPLE 10

A coloring composition was prepared from the following formulation:

| Ingredients | Parts by weight |
| --- | --- |
| Free acid type C.I. Acid Red 37 | 100 |
| 2-hydroxyethyl acrylate | 85 |
| 5,5'-dimethylhydantoine | 10 |
| Diethylene glycol | 60 |
| Sulfuric acid | 1 |

The above ingredients were reacted and treated generally as described in Example 2 and then the pH was adjusted to 7 to 8 with lithium hydroxide to obtain a coloring composition containing 20 percent by weight of the dye.

EXAMPLE 11

A coloring composition was prepared from the following formulation:

| Ingredients | Parts by weight |
| --- | --- |
| Free acid type C.I. Acid Black 41 | 100 |
| N—vinylpyrrolidone | 72 |
| m-phenylenediamine | 10 |
| 2-pyrrolidone | 50 |

The above ingredients were reacted and treated generally as described in Example 1 and then the pH was adjusted to 8 to 9 with sodium hydroxide to obtain a coloring composition containing 20 percent by weight of the dye.

EXAMPLE 12

A coloring composition was prepared from the following formulation:

| Ingredients | Parts by weight |
| --- | --- |
| Free acid type C.I. Acid Yellow 42 | 100 |
| N—vinylpyrrole | 75 |
| Tolylene-2,4-diamine | 10 |
| N—methylpyrrolidone | 50 |
| p-toluenesulfonic acid | 2 |

The above ingredients were reacted and treated generally as described in Example 2 and then the pH was adjusted to 9 to 10 with sodium hydroxide to obtain a coloring composition containing 15 percent by weight of the dye.

EXAMPLE 13

A coloring composition was prepared from the following formulation:

| Ingredients | Parts by weight |
| --- | --- |
| Free acid type C.I. Acid Blue 45 | 100 |
| N—vinylsuccinimide | 85 |
| Melamine | 10 |
| Ethylene glycol | 50 |

The above ingredients were reacted and treated generally as described in Example 1 and then the pH was adjusted to 8 to 9 with sodium hydroxide to obtain a coloring composition containing 20 percent by weight of the dye.

EXAMPLE 14

A coloring composition was prepared from the following formulation:

| Ingredients | Parts by weight |
| --- | --- |
| C.I. Basic Green 4 | 100 |
| N—vinylpyrrolidone | 37 |
| 2-hydroxyethyl methacrylate | 36 |
| Benzoguanamine | 10 |
| Propylene glycol | 70 |
| Sulfuric acid | 1 |

The above ingredients were reacted and treated generally as described in Example 2 and then the pH was adjusted to 3 to 4 with ammonia to obtain a coloring composition containing 20 percent by weight of the dye.

EXAMPLE 15

A coloring composition was prepared from the following formulation:

| Ingredients | Parts by weight |
| --- | --- |
| C.I. Acid Violet 41 | 100 |
| Acrylamide | 30 |
| N—vinylmonoethyleneurea | 45 |
| o-tolydine | 8 |
| N—methylpyrrolidone | 60 |
| Butyl/peroxide | 3 |

The above ingredients were reacted and treated generally as described in Example 3 and then the pH was adjusted to 9 to 10 with sodium hydroxide to obtain a coloring composition containing 15 percent by weight of the dye.

EXAMPLE 16

A coloring composition was prepared from the following formulation:

| Ingredients | Parts by weight |
| --- | --- |
| Color acid type C.I. Acid Red 180 | 100 |
| N—vinylpyrrole | 75 |
| Diphenylguanidine | 8 |
| Ethylene glycol | 60 |

The above ingredients were reacted and treated generally as described in Example 1 and then the pH was adjusted to 7 to 8 with ammonia to obtain a coloring composition containing 15 percent by weight of the dye.

EXAMPLE 17

A coloring composition was prepared from the following formulation:

| Ingredients | Parts by weight |
| --- | --- |
| C.I. Acid Blue 1 | 100 |
| Acrylic acid | 85 |
| p-phenylenediamine | 10 |
| 2-pyrrolidone | 60 |
| Hydrochloric acid | 1 |

The above ingredients were reacted and treated generally as described in Example 2 and then the pH was adjusted to 6 to 7 with sodium hydroxide to obtain a coloring composition containing 15 percent by weight of the dye.

EXAMPLE 18

A coloring composition was prepared from the following formulation:

| Ingredients | Parts by weight |
| --- | --- |
| Free acid type C.I. Acid Yellow 17 | 100 |
| Methyl acrylate | 85 |
| p-aminophenol | 10 |
| N—methylpyrrolidone | 50 |
| Hydrochloric acid | 3 |

The above ingredients were reacted and treated generally as described in Example 2 and then the pH was adjusted to 9 to 10 with lithium hydroxide to obtain a coloring composition containing 20 percent by weight of the dye.

EXAMPLE 19

A coloring composition was prepared from the following formulation:

| Ingredients | Parts by weight |
|---|---|
| C.I. Acid Black 51 | 100 |
| Acrylamide | 35 |
| N—vinylpyrrolidone | 50 |
| 2-phenyl-4,5-dihydroxyimidazole | 10 |
| 2-pyrrolidone | 50 |
| Azobisisobutyronitrile | 3 |

The above ingredients were reacted at a temperature of 60° to 70° C. for 10 hours and treated generally as described in Example 3 and the pH was adjusted to 7 to 8 with sodium hydroxide to obtain a coloring composition containing 15 percent by weight of the dye.

EXAMPLE 20

A coloring composition was prepared from the following formulation:

| Ingredients | Parts by weight |
|---|---|
| Free acid type C.I. Direct Black 17 | 100 |
| 2-vinylpyridine | 85 |
| Thiourea | 10 |
| Diethylene glycol | 50 |
| Benzenesulfonic acid | 2 |

The above ingredients were reacted and treated generally as described in Example 2 and then the pH was adjusted to 9 to 10 with sodium hydroxide to obtain a coloring composition containing 15 percent by weight of the dye.

COMPARATIVE EXAMPLE

For the purpose of comparison, concentrated solutions of water-soluble dyes were prepared from the following formulations by mixing and optionally filtrating.

COMPARATIVE EXAMPLE 1

| Ingredients | Parts by weight |
|---|---|
| C.I. Acid Red 87 | 20 |
| N—methylpyrrolidone | 25 |
| Distilled water | 55 |

COMPARATIVE EXAMPLE 2

| Ingredients | Parts by weight |
|---|---|
| C.I. Acid Yellow 11 | 15 |
| Ethylene glycol | 20 |
| Distilled water | 65 |

COMPARATIVE EXAMPLE 3

| Ingredients | Parts by weight |
|---|---|
| C.I. Acid Black 2 | 25 |
| 2-pyrrolidone | 13 |
| Diethylene glycol | 23 |
| Distilled water | 39 |

COMPARATIVE EXAMPLE 4

| Ingredients | Parts by weight |
|---|---|
| C.I. Direct Black 154 | 15 |
| N—methylpyrrolidone | 10 |
| Diethylene glycol | 11 |
| Distilled water | 64 |

COMPARATIVE EXAMPLE 5

| Ingredients | Parts by weight |
|---|---|
| C.I. Acid Black 52 | 20 |
| N—methylpyrrolidone | 17 |
| Ethylene glycol | 6 |
| Distilled water | 57 |

COMPARATIVE EXAMPLE 6

| Ingredients | Parts by weight |
|---|---|
| C.I. Basic Violet 3 | 20 |
| Diethylene glycol | 15 |
| Ethylene glycol | 12 |
| Distilled water | 53 |

COMPARATIVE EXAMPLE 7

| Ingredients | Parts by weight |
|---|---|
| C.I. Direct Blue 86 | 20 |
| 2-methylpyrrolidone | 24 |
| Distilled water | 56 |

COMPARATIVE EXAMPLE 8

| Ingredients | Parts by weight |
|---|---|
| C.I. Acid Blue 90 | 20 |
| N—methylpyrrolidone | 7 |
| Diethylene glycol | 7 |
| Ethylene glycol | 16 |
| Distilled water | 50 |

COMPARATIVE EXAMPLE 9

| Ingredients | Parts by weight |
|---|---|
| C.I. Acid Blue 25 | 15 |
| Diethylene glycol | 10 |
| Distilled water | 75 |

COMPARATIVE EXAMPLE 10

| Ingredients | Parts by weight |
| --- | --- |
| C.I. Acid Red 37 | 20 |
| Diethylene glycol | 30 |
| Distilled water | 50 |

COMPARATIVE EXAMPLE 11

| Ingredients | Parts by weight |
| --- | --- |
| C.I. Acid Black 41 | 20 |
| 2-pyrrolidone | 25 |
| Distilled water | 55 |

COMPARATIVE EXAMPLE 12

| Ingredients | Parts by weight |
| --- | --- |
| C.I. Acid Yellow 42 | 15 |
| N—methylpyrrolidone | 20 |
| Distilled water | 55 |

COMPARATIVE EXAMPLE 13

| Ingredients | Parts by weight |
| --- | --- |
| C.I. Acid Blue 45 | 20 |
| Ethylene glycol | 20 |
| Distilled water | 60 |

COMPARATIVE EXAMPLE 14

| Ingredients | Parts by weight |
| --- | --- |
| C.I. Basic Green 4 | 20 |
| N—methylpyrrolidone | 8 |
| Propylene glycol | 20 |
| Distilled water | 52 |

COMPARATIVE EXAMPLE 15

| Ingredients | Parts by weight |
| --- | --- |
| C.I. Acid Violet 41 | 15 |
| N—methylpyrrolidone | 15 |
| Diethylene glycol | 5 |
| Distilled water | 65 |

COMPARATIVE EXAMPLE 16

| Ingredients | Parts by weight |
| --- | --- |
| C.I. Acid Red 180 | 15 |
| N—methylpyrrolidone | 11 |
| Ethylene glycol | 9 |
| Distilled water | 65 |

COMPARATIVE EXAMPLE 17

| Ingredients | Parts by weight |
| --- | --- |
| C.I. Acid Blue 1 | 15 |
| 2-pyrrolidone | 10 |
| Diethylene glycol | 13 |
| Distilled water | 62 |

COMPARATIVE EXAMPLE 18

| Ingredients | Parts by weight |
| --- | --- |
| C.I. Acid Yellow 17 | 20 |
| N—methylpyrrolidone | 8 |
| Diethylene glycol | 12 |
| Distilled water | 60 |

COMPARATIVE EXAMPLE 19

| Ingredients | Parts by weight |
| --- | --- |
| C.I. Acid Black 51 | 15 |
| 2-pyrrolidone | 15 |
| Diethylene glycol | 5 |
| Distilled water | 65 |

COMPARATIVE EXAMPLE 20

| Ingredients | Parts by weight |
| --- | --- |
| C.I. Direct Black 17 | 15 |
| N—methylpyrrolidone | 13 |
| Diethylene glycol | 7 |
| Distilled water | 65 |

EXAMPLE A

The resultant coloring compositions according to the above examples and the comparative examples were subjected to a hue test and a stability test. Solution stability was determined by a stability after test by leaving the solution to stand for 3 months at room temperature. pH stability was recorded by a stability range of pH of the solution formed from diluting the composition with distilled water to dissolve completely. The result of the tests is shown in Table 1.

TABLE 1

| Example | | | | Comparative Example | | |
| --- | --- | --- | --- | --- | --- | --- |
| | | stability | | | stability | |
| No. | Hue | solution | pH | No. | solution | pH |
| 1 | clear | good | more than 4 | 1 | good | more than 6 |
| 2 | same | " | more than 5 | 2 | not complete dissolution | (3%) more than 8 |
| 3 | " | " | more than 4 | 3 | " | (15%) more than 8 |
| 4 | " | " | more than 6 | 4 | precipitate after one month | more than 8 |
| 5 | " | " | more than 3 | 5 | not complete dissolution | (15%) more than 5 |
| 6 | slightly dull | " | less than 7 | 6 | " | (10%) less than 2 |

TABLE 1-continued

| Example | | | | Comparative Example | | |
|---|---|---|---|---|---|---|
| | | stability | | | stability | |
| No. | Hue | solution | pH | No. | solution | pH |
| 7 | " | " | more than 4 | 7 | " (10%) | more than 6 |
| 8 | " | " | less than 7 | 8 | " (15%) | less than 5 |
| 9 | same | " | more than 5 | 9 | " (3%) | more than 5 |
| 10 | clear | " | more than 4 | 10 | " (15%) | more than 7 |
| 11 | slightly dull | " | more than 6 | 11 | " (15%) | more than 8 |
| 12 | clear | " | more than 4 | 12 | " (10%) | more than 8 |
| 13 | " | " | more than 6 | 13 | " (8%) | more than 8 |
| 14 | slightly dull | " | less than 6 | 14 | complete dissolution | less than 5 |
| 15 | " | " | more than 6 | 15 | not complete dissolution (5%) | more than 9 |
| 16 | clear | " | more than 5 | 16 | " (10%) | more than 8 |
| 17 | slightly dull | " | less than 8 | 17 | complete dissolution | less than 7 |
| 18 | clear | " | more than 4 | 18 | " | more than 8 |
| 19 | " | " | more than 6 | 19 | not complete dissolution (10%) | more than 8 |
| 20 | " | " | more than 6 | 20 | " (10%) | more than 9 |

EXAMPLE B [Water resistance test]

An aqueous ink was prepared by the following formulation using the above coloring composition of the present invention or the concentrated solution of the comparative examples.

| Ingredients | Parts by weight |
|---|---|
| The coloring composition (or the concentrated solution) | 15 to 60 |
| Ethylene glycol | 10 |
| Diethylene glycol | 10 |
| Distilled water | All the rest |

The obtained aqueous ink was charged in a felt tip pen container to write down continuously with a writing machine. The written trace was dipped in distilled water for one minute after 30 minutes from writing down at the start and pulled up and dried up to evaluate the written trace. The result is shown in Table 2.

TABLE 2

| | Coloring composition (parts) | Evaluation | |
|---|---|---|---|
| No. | | Example | Comparative Example |
| 1 | 40 | 4 | 1 |
| 2 | 25 | 2 | 0 |
| 3 | 40 | 2 | 0 |
| 4 | 60 | 5 | 1 |
| 5 | 50 | 3 | 0 |
| 6 | 15 | 4 | 2 |
| 7 | 30 | 2 | 0 |
| 8 | 30 | 5 | 2 |
| 9 | 40 | 4 | 2 |
| 10 | 40 | 2 | 0 |
| 11 | 50 | 4 | 1 |
| 12 | 40 | 3 | 1 |
| 13 | 30 | 3 | 0 |
| 14 | 20 | 3 | 0 |
| 15 | 40 | 4 | 1 |
| 16 | 50 | 3 | 1 |
| 17 | 40 | 2 | 0 |
| 18 | 25 | 2 | 0 |
| 19 | 60 | 3 | 0 |
| 20 | 60 | 4 | 2 |

[Evaluation]
5: The written trace remains within the range of 100 to 90%.
4: The written trace remains within the range of 90 to 70%.
3: The written trace remains within the range of 70 to 50%.
2: The written trace remains within the range of 50 to 30%.
1: The written trace remains within the range of 30 to 10%.
0: The written trace remains within the range of 10 to 0%.

What is claimed is:

1. A coloring composition prepared by a process comprising reacting:
   a vinyl compound soluble in water or in a water soluble organic solvent; and
   a compound which contains at least two groups having an active hydrogen, wherein at least one group of said compound is an amino group or imino group in the presence of a water soluble dye, at an elevated temperature or in the presence of a catalyst.

2. The composition according to claim 1, further comprising a solvent.

3. The composition of claim 1, wherein the vinyl compound is selected from the group consisting of 2-hydroxyethyl acrylate, 2-hydroxyethyl methacrylate, 2-methoxypolyethylene glycol methacrylate, N-vinylpyrrole, N-vinylpyrrolidone, N-vinylsuccinimide, N-vinylethyleneurea, N-vinyloxazolidone, 1-methyl-2-vinylpiperidine, N-vinylpiperidone, N-vinylcaprolactam and a mixture thereof.

4. The composition of claim 1, wherein the amount of the vinyl compound is from 10 to 40 percent by weight in said coloring composition.

5. The composition of claim 1, wherein the active hydrogen containing compound is selected from the group consisting of m-aminophenol, m-phenylenediamine, p-phenylenediamine, 2-chloro-mphenylenediamine, m-phenylenediamine-4-sulfonic acid, 5,5-dimethylhydantoine, diphenylguanidine, benzoguanamine, urea and thiourea.

6. The composition of claim 2, wherein the amount of the active hydrogen containing compound is from 2 to 10 percent by weight in said coloring composition.

7. The composition of claim 1, wherein the amount of the solvent is less than 40 percent by weight in said coloring composition.

8. The composition of claim 1, wherein the molar ratio of the vinyl compound to the active hydrogen containing compound is 100:5 to 30.

9. The composition of claim 1, wherein the amount of water soluble dye is from 30 to 50 percent by weight of the composition.

10. The composition of claim 1, wherein the vinyl compound is selected from the group consisting of acrylic acid, acrylamide, 2-acrylamide-2-methylpropanesulfonic acid, methacrylic acid, diethylaminoethyl methacrylate, allysulfonic acid, styrenesulfonic acid, 5-vinylpyrazoline, 2-vinylthiazole, 2-vinylpyridine, 4-vinylpyridine, 4-vinylpiperidine, 2-vinylpyrazine and a mixture thereof.

11. The composition of claim 1, wherein the active hydrogen containing compound is selected from the group consisting of p-aminophenol, 2-aminophenol-4-sulfonamide, 2,5-dichloro-m-phenylenediamine, tolylene-2,4-diamine, m-xylylenediamine, o-tolidine, 2-phenyl-4,5,-dihydroxymethylimidazol, melamine, melamine resin, guanidine and a mixture thereof.

12. The composition of claim 1, wherein the reaction of the vinyl compound and the active hydrogen containing compound is in the presence of a catalyst.

13. The composition according to claim 12, wherein the catalyst is selected from the group consisting of an acid catalyst, an azo-initator and a peroxide.

14. The composition of claim 12, wherein the catalyst is an acid catalyst selected from the group consisting of hydrogen chloride, sulfuric acid, phosphoric acid, benzenesulfonic acid, p-toluenesulfonic acid, a free acid of the vinyl compound, an acid salt of the active hydrogen containing compound, a free acid of the dye and a coloring acid.

15. The composition of claim 12, wherein the content of catalyst is less than 5% by weight in said coloring composition mixture.

16. The composition of claim 12, wherein the reaction is conducted at a temperature of 10° to 160° C., for 0.5 to 10 hours.

17. The composition of claim 12, wherein the temperature is from 60° to 110° C.

18. The composition of claim 1, wherein the composition is from 15 to 25 percent by weight based on the amount of the dye.

19. The composition according to claim 1, wherein the solvent is selected from the group consisting of lower alcohols having 1 to 6 carbon atoms, ethylene glycol, diethylene glycol, triethyleneglycols, glycol ethers, glycol monoacetate, glycerol, glycolic acids, ethylene carbonate, butyrolactone, 2-pyrrolidone, N-methylpyrrolidone, dimethyl formamide, tetrahydrofuran, dioxane, dimethylsuloxide and a mixture thereof.

20. The composition according to claim 1, wherein the amount of the organic solvent is less than 40 percent by weight in the reaction composition.

* * * * *